No. 880,087. PATENTED FEB. 25, 1908.
G. LÜSEBRINK.
STEAM TRAP.
APPLICATION FILED FEB. 17, 1906.

Witnesses:

Inventor
Gustav Lüsebrink
By Wm E Boulder
Attorney

UNITED STATES PATENT OFFICE.

GUSTAV LÜSEBRINK, OF HAGEN, GERMANY.

STEAM-TRAP.

No. 880,087.　　　Specification of Letters Patent.　　　Patented Feb. 25, 1908.

Application filed February 17, 1906. Serial No. 301,630.

*To all whom it may concern:*

Be it known that I, GUSTAV LÜSEBRINK, a subject of the German Empire, residing at Hagen, in Westphalia, Empire of Germany, have invented certain new and useful Improvements in Steam-Traps, of which the following is a specification.

Steam traps hitherto used are more or less complicated or unreliable in action, and mostly do not work in a noiseless manner. The latter is an unpleasant drawback, more particularly in heating installations in dwelling houses.

By means of this invention a reliable action, together with perfect noiselessness, is obtained in the simplest manner.

A construction of a trap according to this invention is illustrated, by way of example, in the accompanying drawing.

Figure 1:
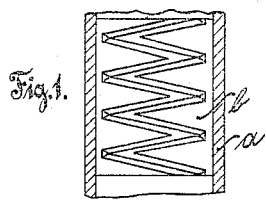

As shown in Figure 1, a body $b$, provided at the circumference with zig-zag shaped recesses of any desired arrangement, is inserted into the pipe $a$.

Figure 2:
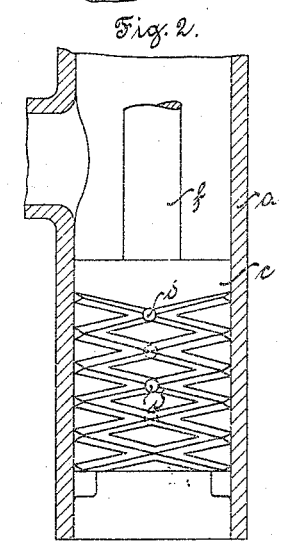
Figure 3:
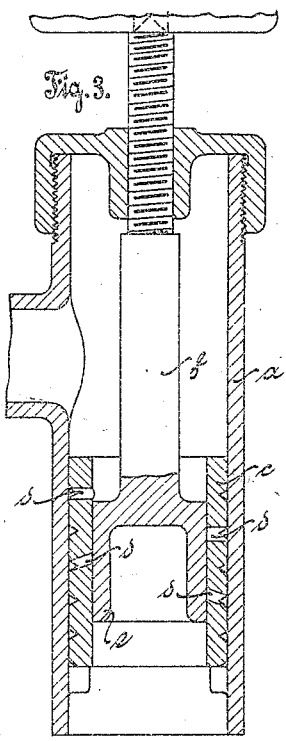

As shown in Figs. 2 and 3, a hollow body $c$ provided at certain distances, beginning from the top with intersecting recesses is inserted into the pipe $a$. The wall of the hollow body $c$ is provided at different levels with holes $d$ which establish communication between the hollow space and the recesses, and can be arranged either straight or obliquely. Into the hollow space of the body $c$ is inserted a piston $e$ which can be moved up and down by means of a screwed rod $f$. By means of this piston all the holes $d$ of the body $c$ can be covered or, as desired, one or more of them opened, and in this way the discharge of the water of condensation regulated. The recesses of the body $c$ are also made in zig-zag shape like those of the body $b$ in Fig. 1.

Figure 4:
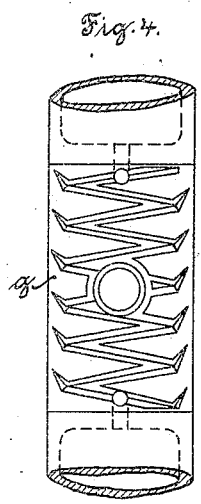
Figure 5:
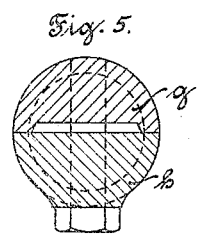

Figs. 4 and 5 show a solid body $g$ recessed in the center and with zig-zag shaped or intersecting recesses on the flat side thereof. The recesses are covered with a part $h$ which, however, can also be provided with recesses, instead of the body $g$. These Figs. 4 and 5 show that the recesses at the turning points are provided with counter recesses.

Figure 6:
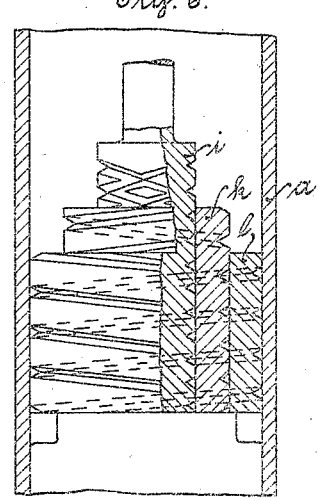

In Fig. 6 several bodies $i$ $k$ and $l$ are shown inserted into each other, those nearer the center projecting beyond the others or all of them being arranged on the same level. The innermost one can be provided with the regulation device shown in Figs. 2 and 3. The two bodies $i$ and $k$ are shown with ordinary helical recesses, the inner one with intersecting recesses, but all the bodies can be provided with zig-zag shaped or intersecting recesses.

Figure 7:
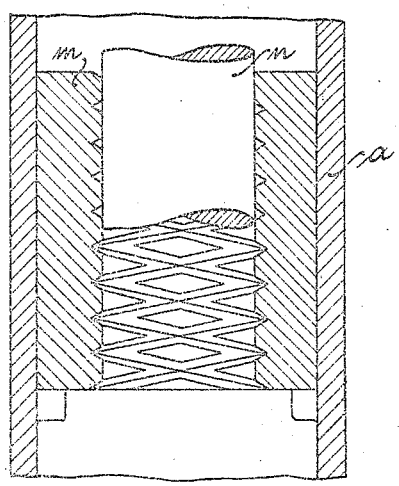

As shown in Fig. 7 the zig-zag shaped or intersecting recesses are arranged on the inner side of a sleeve $m$ this construction being used in cases where another tube or a rod $n$ passes through the pipe $a$.

Water of condensation escapes in the construction shown in Fig. 1 through the zig-zag shaped recesses, while as shown in Figs 2 and 3, the said water collects above the piston $e$ and passes through the hole $d$ to the circumference of the body $c$ and escapes through the recesses.

Air contained in the water of condensation, is carried away with the same, but the steam which after the escape of the water, passes into the recesses and fills them, is deviated at the turning points or at the points of intersection of the zig-zag shaped recesses, and moreover two jets coming from the opposite direction strike each other at the points of intersection of the recesses. The steam thus continually loses pressure and speed and is condensed, so that no steam can escape from the apparatus.

The apparatus can be used everywhere where water and air, or only water, are to be discharged, and the steam prevented from escaping. After the conduit connected to the apparatus is stopped the air can freely pass through the same.

What I claim as my invention and desire to secure by Letters Patent is—

1. A steam trap comprising a pipe, a hollow grooved plug therein and provided with openings in communication with the interior of the plug and the grooves thereof, and a piston reciprocable in said plug and adapted to cover and uncover said openings substantially as set forth.

2. A steam trap comprising a pipe a hollow grooved plug therein water outlet passages in said plug and a piston reciprocable in said plug substantially as set forth.

3. A steam trap comprising a pipe and a double spirally-grooved tortuous plug fitting therein substantialy as set forth.

4. A steam trap comprising a pipe and a series of tortuous grooved plugs fitting one within the other inside said pipe substantially as set forth.

5. A steam trap comprising a pipe and a grooved plug fitting closely within the pipe, the groove of the plug being at all times adapted to establish communication between the spaces above and below the plug without requiring adjustment of said plug.

In testimony whereof I have signed my name to this specification in the presence of two subscribing witnesses.

GUSTAV LÜSEBRINK.

Witnesses:
OTTO KÖNIG,
ARTHUR MATTHÄUS.